July 14, 1936.  W. F. KALLOCK  2,047,269
WRAPPING MATERIAL
Filed June 15, 1932
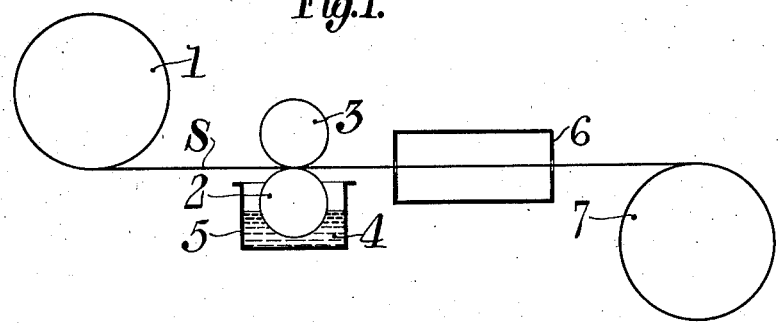
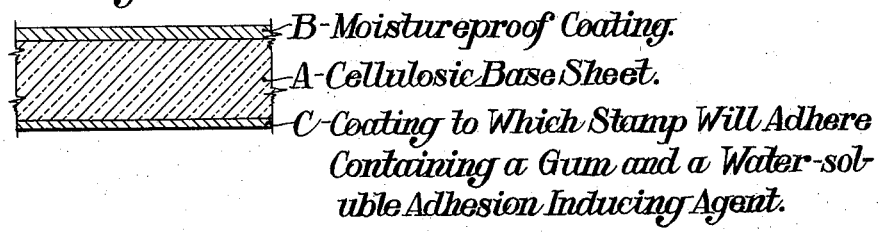
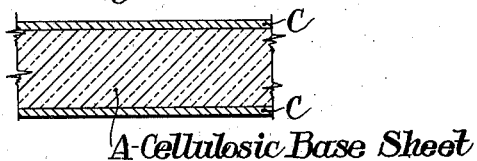
Wilmer F. Kallock,
Inventor, Patented July 14, 1936

2,047,269

UNITED STATES PATENT OFFICE 2,047,269

WRAPPING MATERIAL

Wilmer F. Kallock, Rochester, N. Y., assignor to Eastman Kodak Company, Rochester, N. Y., a corporation of New York Application June 15, 1932, Serial No. 617,345

16 Claims. (Cl. 91—68)

This invention relates to wrapping materials, and has particular reference to a thin, flexible, transparent type of cellulosic sheeting, one or both of the surfaces of which is adapted for the application of water-soluble adhesives.

Several types of flexible, transparent sheeting formed from cellulosic material have been developed in recent years and have found wide use as wrapping material and in the manufacture of many kinds of packages, cartons, envelopes, and other containers. Some of these wrapping materials have been waterproofed or moisture-proofed by the application of a water-resistant composition, while others have not been so treated. The moisture-proof materials have met with some degree of success due to their peculiar properties of water-resistance, transparency, flexibility, toughness, and general adaptability to wrapping purposes. Notwithstanding these valuable properties, they have one serious drawback, namely, the fact that the ordinary types of cellulosic surfaces, especially those produced from cellulose ester materials, are not suitable for the application of water-soluble adhesives. It is a matter of common knowledge that when a tax stamp, label, gummed strip or the like having an adhesive surface of glue, gum arabic, or other adhesive materials, is moistened and applied to the above mentioned types of cellulosic sheeting, it almost immediately curls up and drops off because of the incompatibility of the adhesive substance and the cellulosic material. The inability of these materials to permanently receive a water-soluble adhesive is accentuated in those cases where application of the adhesive is made over a moisture-proof coating.

This I regard as true of the well known type of viscose or regenerated cellulose sheeting which is moisture-proofed upon both sides thereof by a nitrocellulose or other cellulose derivative lacquer. A water soluble adhesive coated stamp or other object has the same inability of adhering to such moisture-proofed surface as it does to sheeting composed of a cellulose derivative. It is unsatisfactory to moisture-proof only one side of such regenerated cellulose sheeting and attempt to stick a stamp on the opposite or uncoated surface for the reason that, while the stamp will adhere to a certain degree (although not tenaciously) such a sheet when moisture-proofed upon one side is totally unsuccessful as a moisture resisting material for the reason that difficulty is encountered in packaging therewith under anything except substantially dry conditions. Furthermore, the sheet will buckle and change in dimensions during varying atmospheric conditions and is not in any sense moisture-proofed for the reason that the regenerated cellulose base takes up moisture quite rapidly and is very permeable to moisture even though it has been coated upon one side with a moisture-proof coating. In order to overcome this difficulty, a number of remedies have been suggested, including the proposal to use a special type of adhesive on the stamps or labels themselves, or to employ a special adhesive cement when affixing them which cement would be compatible with the cellulosic surface, but none of these remedies have thus far proved convenient or commercially practicable.

It is the primary object of my invention to overcome the difficulties just referred to, and to provide a means whereby the ordinary types of water-soluble adhesives may be successfully employed with cellulosic sheeting. Another and specific object is to provide a means for applying the conventional types of gummed labels, tax stamps, and other matter having a surface coated with a water-soluble adhesive, to cellulosic sheeting by merely moistening the adhesive surface and affixing the stamp or label in the customary manner. A further object is to provide a new type of moisture-resistant cellulosic sheeting at least one of the surfaces of which is adapted to the application of water-soluble adhesives, such as glue and gum arabic. A still further object is to provide a new type of sheeting having one surface moisture-proofed and the other surface comprising an extremely thin layer of material to which water-soluble adhesives will permanently adhere. Another object is to provide a type of sheeting having moisture-proof and stamp-adhering surfaces susceptible of fluxing or sealing by means of a common solvent. Other objects will hereinafter appear.

My invention is based upon the discovery that permanent adhesion of water-soluble adhesives to cellulosic surfaces may be obtained by applying to such surfaces a composition containing a special ingredient which is water-soluble and which, upon application of the moistened adhesive dissolves and mingles therewith, thereby causing the adhesive to stick to the coating and in turn to the cellulosic surface itself. This composition comprises (a) a natural or synthetic resin or gum soluble in an organic solvent but insoluble in water; (b) a material which is soluble in a common solvent with (a) and which is also water-soluble, both components (a) and (b) being dissolved in an organic solvent (c) which is a common solvent for (a) and (b). The component (a) causes adhesion of the coating to the base. Component (b), which is dispersed throughout the coating, being water-soluble, is slightly dissolved by the water on the gummed label, stamp, or other adhesive material, allowing the softened or dissolved material on the stamp to mingle with the dissolved or softened portions of the water-soluble material in the coating.

The sheet material to which these compositions are applied may be moisture-proofed or unmoisture-proofed thin, flexible, transparent sheets of cellulose ester material, such as cellulose acetate, cellulose propionate, cellulose butyrate, cellulose acetate-propionate, cellulose acetate-butyrate, and the like. In using moisture-proofed material, I prefer a cellulose acetate sheet at least one of the surfaces of which has a thin overcoating comprising gum and wax. This moisture-proof sheeting may, for example, be produced in accordance with the disclosure of the copending application of Norman F. Beach, Serial No. 551,491, filed July 17, 1931, and involving the application of a solution of gum and wax in a common solvent to one side of a base sheet of cellulose acetate or other cellulose organic derivative. In some cases, however, the sheeting may be produced according to the process disclosed in the application of Norman F. Beach and James G. McNally, Serial No. 551,490, filed July 17, 1931, in which the cellulosic base sheet is first coated with a gum or resin solution, followed by the application of a wax solution. In any case, when dealing with a moisture-proof material, it should have a moisture-proof coating on one surface only, leaving the other surface free for the application of the special coating composition hereinafted described.

The choice of the organic solvent referred to in the previous paragraph depends to a considerable extent upon the thickness of the sheeting to which the composition is to be applied. On the choice of the solvent depends the choice of components designated (a) and (b) above. If the material has a thickness of .002 or less, a solvent must be chosen that has no appreciable solvent or undesirable softening effect on the sheet. Assuming the composition to be applied to a thin, flexible transparent, sheet of cellulose acetate of approximately .001" in thickness, with or without a gum-wax moistureproofing composition on one side, the solvent may be ethyl alcohol, toluene, or benzene. With ethyl alcohol, the component (a) may be selected from the group comprising resins of the vinyl acetate type, for example, alcohol-soluble polymerized vinyl acetate, resins of the vinyl acetate-vinyl chloride type, resins of the polychlordiphenyl type, gum damar, gum mastic, gum gambage, gum ammoniac, and other natural or synthetic gums or resins soluble in alcohol. Component (b) may be selected from the group comprising adipic acid, thiourea, acetanilide, ammonium benzoate, hexamethylene tetramine, boric acid, citric acid, tartaric acid, tannic acid.

If benzene is the solvent, the component (a) may be selected from the group comprising resins of the vinyl acetate type, resins of the vinyl acetate-vinyl chloride type, resins of the polychlordiphenyl type, gum guiac, gum thus, gum chicle, and other natural or synthetic gums or resins which are soluble in benzene. Component (b) may be selected from the group comprising, ortho dihydroxybenzene (pyrocatechol), p-amino dimethyl aniline, beta-naphthylamine, resorcinol, urea, and the like.

In the following examples of compositions adapted for the production of surfaces to which water-soluble adhesives will permanently adhere, I have set forth several of the preferred embodiments of my invention, but it is to be understood that they are included merely for the purposes of illustration and not as a limitation thereof.

Typical formulae for application to a base sheet of cellulose acetate of approximately .001" thickness are as follows:

1.
  60% Vinyl acetate
  40% Tartaric acid
  Made up to 5% solids in 95% ethyl alcohol 2.
  60% Vinyl acetate
  40% Resorcinol
  Made up to 5% solids in benzene.

If a thicker base sheet is used, say of the order of .002–.005" in thickness methyl alcohol or acetone may be incorporated in the formulae to give some penetration of the coating into the sheet. A typical formula is as follows:

3.
  60% Vinyl acetate
  40% Adipic acid
  Made up to 5% solids in a 50% ethyl alcohol −50% methyl alcohol solvent.

The above formulae are characterized by the inclusion of a water-soluble ingredient, such as tartaric acid, resorcinol, and the like, which is susceptible of being dissolved or partially dissolved by the water applied to the gummed label or stamp which it is desired to attach to the sheeting, thereby permitting the adhesive material on the stamp to mingle with the coating, causing permanent adhesion.

Assuming the invention is applied to the manufacture of a moisture-proof type of cellulosic sheeting, one side of which has an overcoating of gum and wax or other moisture-resistant materials, a thin coating of the composition typified by the above formulae is applied to the unmoistureproofed side of the sheet, the solvents are evaporated and a thin layer containing gum or resin mixed with the water-soluble component is left deposited thereon. The manufacture of my improved type of sheeting will be made clear by reference to the accompanying drawing in which:

Fig. 1 is a diagrammatic representation of one form of apparatus suitable for the manufacture of a sheet moistureproofed on one side and specially treated according to the present invention on the other.

Fig. 2 is a cross section through a portion of a sheet having a moisture-proof layer on one side and a special stamp-adhering layer on the other, the thickness of the base sheet and the surface layers being greatly exaggerated for the sake of clearness of illustration.

Fig. 3 is a cross section through a portion of a sheet having a stamp-adhering layer on both sides, the thickness of the respective layers as in Fig. 2 being greatly exaggerated in the interest of clearness of illustration.

A suitable method of applying the special composition described above is illustrated in Fig. 1. A thin, flexible, transparent, sheet of cellulosic material, cellulose acetate, for example, moistureproofed on one side by the application of a gum wax containing composition, passes from supply roll 1 between subbing roll 2 and squeeze roll 3, the moistureproofed side being uppermost. Roll 2 dips in a bath of liquid 4 contained in vat 5. This bath may comprise any one of the formulae given above. Roll 2 applies the composition to the under-surface of the sheet S. Squeeze roll 3, which may be mounted so as to give the desired pressure to the sheet, serves to control the thickness of the coating applied to the underside of the sheet as it passes between the rolls. The sheet S then passes through drying chamber 6 at a speed of about 10–30 feet per minute where it is subjected to a temperature of about 100–120° C. Upon emerging from the drying chamber, it is passed to wind-up roll 7.

If it is desired to apply the special treating liquid to both sides of an unmoistureproofed material, the sheet may be immersed in or drawn through a bath of the treating liquid according to the well known principle of immersion application of coating fluids to sheets or webs.

Although I have described the application of the special composition to a previously formed sheet of material, the coating operation may be carried out in connection with the manufacture of the sheeting itself. In such a process the sheet is coated onto an appropriate surface from a suitable dope or solution, the solvents are evaporated therefrom, the sheet stripped from the coating surface, and thereafter passed directly to the operation in which the special treating liquid of the present invention is applied; if desired, a stamp-adhering layer may be applied to one side of the unmoistureproofed material followed by application of a moisture resistant coating to the other side, much in the same manner as illustrated in the Beach and Babcock application Serial No. 617,349 filed of even date herewith.

It will be apparent that many changes may be made within the scope of my invention. For example, instead of using a base sheet of cellulose acetate, I may apply the above described special compositions equally well to a base sheet of cellulose propionate, cellulose acetate-propionate, cellulose acetate-stearate, and to sheets of regenerated cellulose. Although there is no special problem presented in causing stamps to initially adhere to regenerated cellulose surfaces, it is found that adhesion is not permanent because of the fact that the unmoistureproofed material is very susceptible to softening by absorbed moisture with the result that stamps and gummed labels become loosely held and are easily removed or rubbed off. It is accordingly one of the features of my invention that I am enabled to render such sheeting capable of permanently receiving water-soluble adhesives, and thereby also to render it less susceptible to moisture.

While I have described the treatment of a thin, flexible transparent cellulosic material, my invention is not limited thereto. It is equally applicable to the treatment of thin cellulosic material of a thickness of .001" or less and to the treatment of thick sheets or even slabs or blocks of cellulosic materials or molded objects. It should be noted, however, that the thickness of the material governs to a large extent the particular solvent or solvent combination employed in the coating formula. With the thinner types of material, such as those commonly used for wrapping purposes, it is necessary to select a solvent which will have no appreciable solvent action upon the base sheet itself. With thicker materials, the solvent may have some slight softening action sufficient to cause penetration of the composition into the material. In any case, however, the action of the solvent should not go to the point of solution of the material, but should be controlled so as to avoid an undesirable softening or weakening thereof.

Reference to Figs. 2 and 3 discloses the general nature of the sheeting produced according to the present invention. In Fig. 2 sheet A is a relatively thin cellulosic sheet of approximately .001" in thickness having a thin coating B comprising a moisture-resistant material containing preferably gum and wax. Upon the opposite side of the sheet is the layer C which consists of an extremely thin coating containing a natural or synthetic gum and a water-soluble adhesion-inducing agent dispersed therein. The material illustrated in Fig. 3 differs from that of Fig. 2 in that the moisture-resistant coating is omitted from one side of the sheet and the special stamp-adhering coating C is applied to both sides thereof. In either type of sheeting the material of the base sheet may be a cellulose ester or may even be regenerated cellulose.

It will be apparent that the product of the present invention has many features which distinguish it from known products of a similar nature. It is particularly distinguished by the fact that the cellulosic surface is rendered susceptible to the permanent adhesion of water-soluble gums and the like by application of a thin overcoating containing a substance which is dissolved by water and thereby rendered miscible with the water-soluble material on the label or stamp which is applied thereto. An important although less obvious feature of the invention resides in the fact that in the case of moisture-proof materials both the moisture-proof surface and the stamp adhering surface are susceptible of being united by the fluxing or dissolving of their respective coatings with a common solvent. This is especially important in connection with the manufacture of cartons, food containers, cigarette packages and the like, since it eliminates the necessity for applying a cement in order to join the two different types of surfaces. All that is necessary is to apply a proper solvent or solvent combination to one or both surfaces, bring them into contact and apply pressure. An immediate fusing of the respective coatings results in a strong transparent seal or joint.

We have found that the common solvent used for fluxing the coatings of the finished sheet for the purpose of sealing or forming joints should be selected with reference to the ingredients used in the respective coatings. For example, with moistureproof sheeting, the moistureproof surface of which contains an alcohol-soluble form of vinyl acetate and paraffin wax, and the stamp-adhering surface of which contains vinyl acetate and tartaric acid, the solvent may consist of any one of the following: ethyl tartrate, butyl tartrate, tetrahydrofurfuryl acetate, toluene-diacetone alcohol-triacetin, butyl tartrate-toluene-triacetin, tetrahydrofurfuryl acetate - toluene - triacetin. The particular solvent or solvent combination is determined, not only by the materials present on the surfaces which it is desired to join, but also the material of the base sheet itself. If a drastic softening action on a base sheet of cellulose acetate is desired, a single solvent such as ethyl tartrate or diacetone alcohol may be used. As a general rule, however, it will be desired to apply a sealing solvent which does not materially dissolve the surface of the base sheet itself, but does have a substantial dissolving action on the respective coatings of the coated sheet. When dealing with a sheeting coated on one side with a gum-wax composition, it will be desirable to use a solvent containing a relatively high proportion of a solvent for wax which is also a solvent for the gum component of both the moistureproof and stamp-adhering surfaces. The wax solvent is generally a hydrocarbon, such as toluene, which controls or lessens the dissolving power of the other component of the solvent combination with respect to the material of a base sheet, such as cellulose acetate, for example. In most cases a quick-drying solvent is preferred but in some cases a slow-drying solvent is required. In the latter case, volatility of the solvent combination may be reduced by the addition of a high-boiling solvent or plasticizer such as triacetin, the amount of triacetin being determined according to the speed of drying desired.

It will be seen from the above discussion of solvent sealing that the product of the present invention is a particularly valuable contribution to the packaging art in that it is a type of wrapping material both surfaces of which are susceptible of being joined by means of a common fluxing solvent. It will be apparent that a sheet having a moistureproof composition on one side and a stamp-adhering composition on the other side may be joined by an ordinary lap joint in which a moistureproof surface will be applied to a stamp-adhering surface, two moistureproof surfaces may be joined one to another, and in like manner two stamp-adhering surfaces may be thus joined, all by means of a common solvent.

As is well known, a considerable amount of waste occurs in the ordinary operations of manufacturing coated sheeting and in its use as wrapping and packaging material. This would represent a serious economic loss were it not for recovery processes in which the various ingredients of the sheeting can be reclaimed. The material of the present invention is characterized by the fact that it lends itself particularly well to such processes. A simple and convenient method of reclaiming scrap derived from a moistureproof sheeting of the type herein described comprises leaching the scrap with an organic solvent, which may consist, for example, of a mixture of about equal parts of ethylene chloride and Stoddard solvent (a mixture of low boiling aliphatic hydrocarbons having a boiling range of approximately 141–210° C.) the leaching being carried out at a temperature of about 80° F. This removes simultaneously the moistureproof and stamp-adhering coatings and leaves the scrap in a condition in which it may be used directly in the manufacture of sheeting, film and the like.

What I claim as my invention and desire to be secured by Letters Patent of the United States is:

1. An article of manufacture comprising a thin, flexible transparent sheet of cellulosic material coated with a stamp-adhering layer containing a water-insoluble gum and a water-soluble compound selected from the group consisting of adipic acid, thiourea, acetanalide, ammonium benzoate, boric acid, citric acid, hexamethylene-tetramine, tartaric acid, tannic acid, pyrocatechol, p-amino-dimethyl-aniline, b-naphthylamine, resorcinol, and urea.

2. An article of manufacture comprising a thin, flexible, transparent sheet of cellulose ester material coated with a thin layer of material to which a water-soluble adhesive will permanently adhere and comprising a gum and tartaric acid.

3. An article of manufacture comprising a thin, flexible, transparent sheet of cellulose organic ester material coated with a thin layer of material to which a water-soluble adhesive will permanently adhere and comprising a gum and resorcinol.

4. An article of manufacture comprising a thin, flexible, transparent sheet of cellulosic material coated on one side with a moistureproof composition and on the other with a stamp-adhering layer containing a gum and a water-soluble compound selected from the group consisting of adipic acid, thiourea, acetanalide, ammonium benzoate, boric acid, citric acid, hexamethylene-tetramine, tartaric acid tannic acid pyrocatechol p-amino-dimethyl-aniline, b-naphthylamine, resorcinol, and urea.

5. An article of manufacture comprising a thin, flexible, transparent sheet of cellulose ester material having a moistureproof coating on one side and having on the other side a coating to which a water-soluble adhesive will permanently adhere and comprising a water insoluble gum and tartaric acid.

6. An article of manufacture comprising a thin, flexible, transparent sheet of cellulose ester material having on one side a moistureproof coating and on the other side a thin layer of material to which a water-soluble adhesive will permanently adhere and comprising a water insoluble gum and resorcinol.

7. An article of manufacture comprising a thin, flexible, transparent sheet of cellulose acetate having a moistureproof coating on one side comprising gum and wax and having on the other side a thin layer of material to which a water-soluble adhesive will permanently adhere comprising a water-insoluble gum and tartaric acid.

8. An article of manufacture comprising a thin, flexible, transparent sheet of cellulose acetate having a moistureproof coating on one side comprising gum and wax and having on the other side a thin layer of material to which a water-soluble adhesive will permanently adhere comprising a water-insoluble gum and resorcinol.

9. An article of manufacture comprising a thin, flexible, transparent sheet of regenerated cellulose having on one side a moistureproof coating and having on the other side a coating comprising vinyl acetate resin and tartaric acid.

10. An article of manufacture comprising a thin, flexible, transparent sheet of cellulose acetate having a moistureproof coating on one side comprising gum and wax and having on the other side a thin layer of material to which a water-soluble adhesive will permanently adhere comprising vinyl acetate resin and tartaric acid.

11. An article of manufacture comprising a thin flexible, transparent sheet composed principally of cellulose organic ester material and having a coating on each side thereof, both of which coatings are susceptible of fluxing with a common solvent to form a permanent bond, one being a moistureproof coating and the other a coating to which a water soluble adhesive will permanently adhere and comprising a water-soluble compound displaceable by and miscible with a water-soluble adhesive.

12. An article of manufacture comprising a thin flexible transparent sheet composed principally of cellulose organic ester material and having a coating on each side thereof, both of which coatings are susceptible of fluxing with a common solvent to form a permanent bond, one being a moistureproof coating and the other a coating to which a water soluble adhesive will permanently adhere and comprising a water insoluble gum and a water soluble compound displaceable by and miscible with a water soluble adhesive.

13. An article of manufacture comprising a thin flexible, transparent sheet of cellulose organic ester material having a coating on each side thereof, both of which coatings are susceptible of fluxing with a common solvent to form a permanent bond, one being a moistureproof coating and the other a coating to which a water soluble adhesive will permanently adhere and comprising a water insoluble gum and tartaric acid.

14. An article of manufacture comprising a thin flexible transparent sheet of cellulose acetate having a coating on each side thereof, both of which coatings are susceptible of fluxing with a common solvent to form a permanent bond, one being a gum-wax moistureproof coating and the other a thin coating to which a water soluble adhesive will permanently adhere, and comprising a mixture of vinyl acetate resin and tartaric acid.

15. A finished article of manufacture comprising a thin, flexible, transparent sheet composed principally of cellulose ester material and coated with a dry non-adhesive stamp-adhering layer consisting essentially of a water-insoluble gum and a water-soluble compound having substantially no adhesive properties in and of itself and displaceable by and miscible with a water-soluble adhesive, said stamp-adhering layer being adapted to receive a moistened water-soluble adhesive layer on a stamp and to cause the stamp to adhere to the sheet.

16. A finished article of manufacture comprising a thin, flexible, transparent sheet composed principally of cellulose ester material and coated on one side with a moisture-proof layer and on the other side with a dry non-adhesive stamp-adhering layer comprising a water-insoluble gum and a water-soluble compound having substantially no adhesive properties in and of itself, and displaceable by and miscible with a water-soluble adhesive, said stamp-adhering layer being adapted to receive a moistened water-soluble adhesive layer on a stamp and to cause the stamp to adhere to the sheet.

WILMER F. KALLOCK.